United States Patent [19]

Hansen et al.

[11] Patent Number: 5,704,086

[45] Date of Patent: Jan. 6, 1998

[54] PASSENGER BOARDING BRIDGE

[75] Inventors: Christian M. Hansen, Magna; Kenneth John Stoddard, Roy, both of Utah

[73] Assignee: FMC Corporation, Chicago, Ill.

[21] Appl. No.: 582,053

[22] Filed: Jan. 2, 1996

[51] Int. Cl.$^6$ ............................................. E01D 1/00
[52] U.S. Cl. ........................... 14/71.5; 14/69.5; 14/71.1; 16/91; 16/95 R
[58] Field of Search ....................... 14/71.5, 72.5, 14/73.5, 69.5; 49/404, 424, 425; 414/537; 244/137.1; 212/348, 350, 230, 264; 16/87.4, 91, 94 R, 94 D, 95 R, 96 R; 52/67

[56] References Cited

U.S. PATENT DOCUMENTS

| | | | |
|---|---|---|---|
| 2,700,169 | 1/1955 | Henion | 14/71.5 |
| 3,099,847 | 8/1963 | Lodjic et al. | 14/71.5 |
| 3,377,638 | 4/1968 | Seipos | 14/71.5 |
| 4,161,049 | 7/1979 | Saunders et al. | 14/71.5 |
| 4,423,685 | 1/1984 | Kerckhoff | 105/150 |
| 4,559,660 | 12/1985 | Lichti | 14/71.5 |
| 5,356,675 | 10/1994 | Unger et al. | 428/34 |
| 5,515,654 | 5/1996 | Anderson | 52/118 |
| 5,526,622 | 6/1996 | Augustine | 52/309.9 |

*Primary Examiner*—Tamara L. Graysay
*Assistant Examiner*—Gary S. Hartmann
*Attorney, Agent, or Firm*—Douglas W. Rudy; Michael B. K. Lee

[57] ABSTRACT

Passenger boarding bridge extendable sections are provided with roller assemblies supporting one extendable bridge section relative to a second extendable bridge section wherein the roller assemblies assist in reducing the downward load in the overlapping area of the bridge sections.

19 Claims, 9 Drawing Sheets

FIG_4

FIG_5

FIG_6

FIG_7

FIG_8

FIG_9

FIG_10

FIG_11

FIG_12

FIG_13

FIG_14

FIG_15

FIG_17

FIG_18

FIG_19

PASSENGER BOARDING BRIDGE

This invention relates to passenger boarding bridges for facilitating ingress to and egress from a parked aircraft generally, and more particularly to such bridges which are adjustable in length to accommodate variations in the distance between the door of a parked aircraft and the terminal gate.

Passenger boarding bridges are desirable because they permit passengers and airline personnel to walk, or otherwise traverse the distance, between the gate of an airport terminal and a parked aircraft with ease, eliminating the need to climb stairs, and in relative comfort, protected from wind, rain, snow and ice created by local weather conditions. Typical bridges include two or three telescoping tunnels, which are rectangular in cross-section, the inner one of which is supported by a rotunda arranged to provide passage to and from the terminal through a door or gate and the outer tunnel by a drive unit which can position the outer end of the bridge adjacent a door of the parked aircraft. Changes in the length of the bridge, achieved by extending or retracting the telescoping tunnels, are necessary for a number of reasons, including the provision of a clear, unimpeded path for parking of the aircraft, accommodation of variations in the length of various aircraft types and the location of the passenger door thereon or different doors on a given type of aircraft, compensation for variations in the parked position of the aircraft, and/or clearance for the push vehicle and the aircraft as the aircraft is pushed back, or otherwise moves away, from the gate.

Vertical forces or loads are imposed by each tunnel on the adjacent tunnel as a result of the weight of the tunnels themselves and the individuals, including their luggage and other carry-on items, and equipment, such as wheelchairs, for example, present in the tunnel. Since the tunnels must be moveable relative to each other, roller assemblies have been utilized to transfer the forces from one tunnel to the adjacent tunnel. In prior art bridges, these roller assemblies have included ones carried by the upper corners of the outer tunnel which roll on horizontal flanges at the upper corners of the inner tunnel. In the normal configuration of the bridge, these upper roller assemblies place a compressive load on the inner tunnel, which must be resisted by the side walls of the inner tunnel. As a consequence, the maximum roller loads are limited by the compressive strength of the side walls of the tunnels.

The present invention provides a passenger boarding bridge which eliminates or significantly reduces the compressive loads imposed on side walls of the bridge, which reduces the size of side wall members for a given loading, which eliminates the need for high strength flanges on the upper corners of the inner tunnels, which reduces the number of roller assemblies, which is easier to install and maintain, and which can be less costly to manufacture.

These and other attributes of the present invention, and many of the attendant advantages thereof, will become more readily apparent from a perusal of the following description and the accompanying drawings, wherein:

Figure 1:
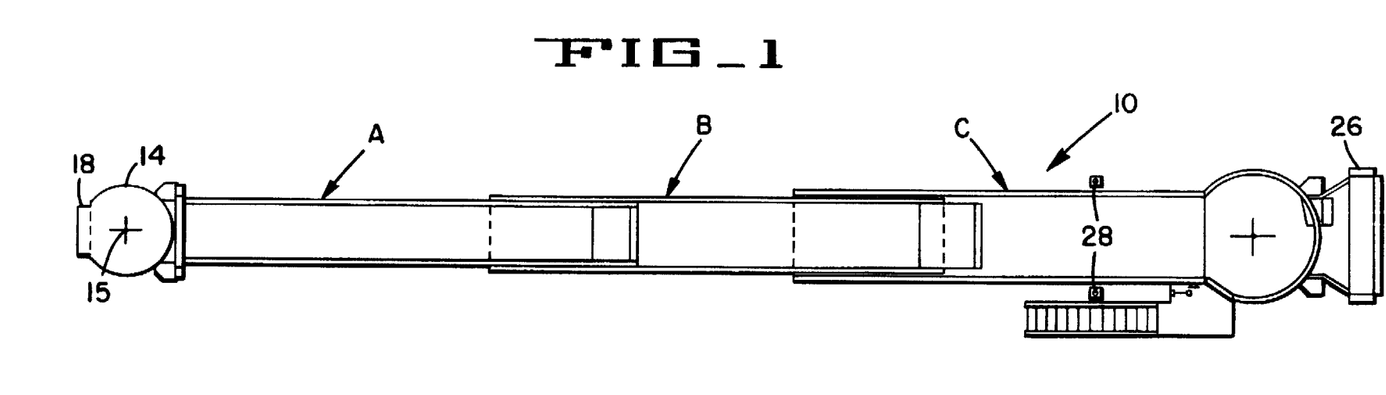
FIG. 1 is a top plan view, with portions broken away for clarity, of a passenger boarding bridge incorporating the present invention.
Figure 2:
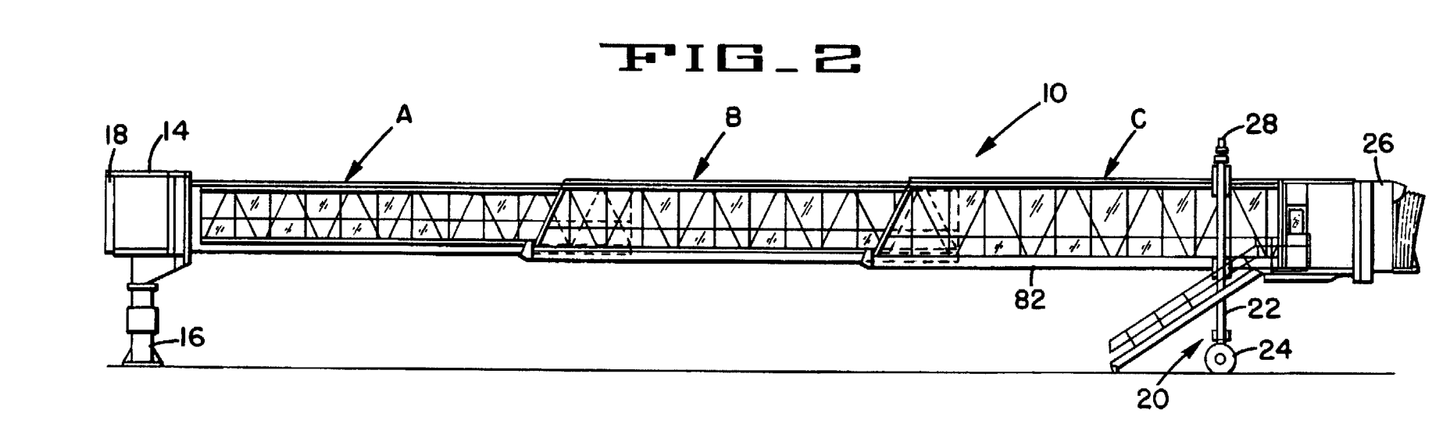
FIG. 2 is a side elevational view of the bridge shown in FIG. 1.
Figure 3:
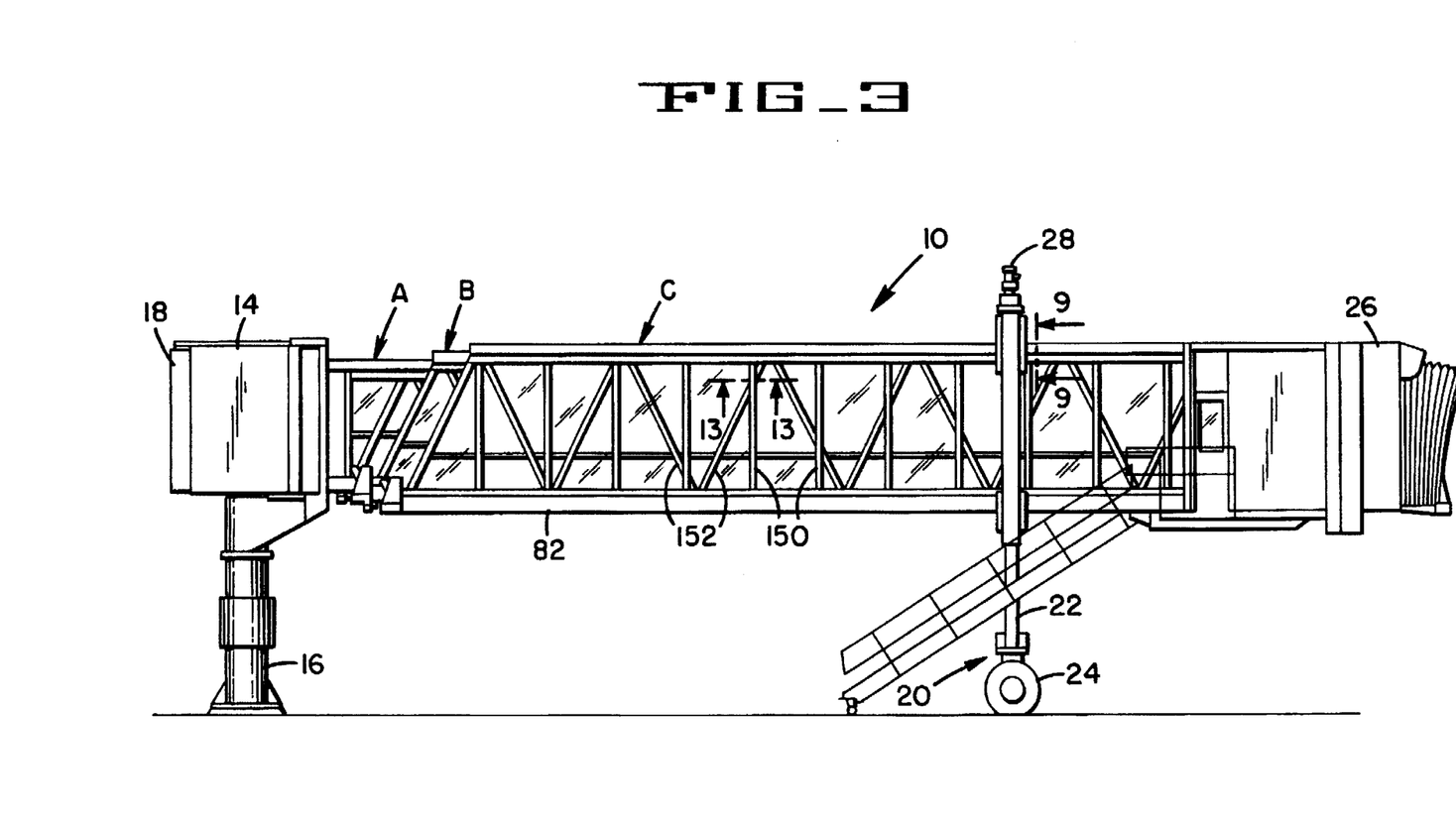
FIG. 3 is a side elevational view similar to FIG. 2, but showing the bridge in its fully retracted configuration.

Referring now to FIGS. 1–3, there is shown a passenger boarding bridge, indicated generally at 10, which has three telescoping sections or tunnels which are, following the convention in the industry, identified in the drawings as the A, B and C tunnels. The A tunnel is pinned to the rigid portion of a rotunda 14 to permit pivoting of the bridge 10 about a horizontal axis to allow the bridge to accommodate the elevation of the door sills on various aircraft. The portion of the rotunda 14 connected to the A tunnel is relatively rotatable, which permits the bridge 10 to pivot about a vertical axis defined by the point 15 in FIG. 1. The rotunda 14 is supported by a pedestal 16 secured to the ground and communicates with a vestibule 18, which can be of variable length, connected to the terminal building, with passage between the terminal building and the vestibule typically being through a lockable security door provided at the left side thereof, as viewed in FIGS. 1–3. The B tunnel slips over and encircles the A tunnel, and slips inside of and is encircled by the C tunnel. The C tunnel is supported by a drive unit 20 having a pair of vertically adjustable jacks 22, with one jack secured to each side of the C tunnel, to raise and lower the end of the bridge 10 adjacent the aircraft, and a pair of independently driven, ground-engaging drive wheels 24. A cab 26 is provided at the distal end of the C tunnel from where the two drive wheels 24 and the jacks 22 may be controlled. Simultaneously raising and lowering both of the jacks 22, which may be screw jacks driven by reversible electric motors 28, for example, will respectively raise and lower the cab floor so that it is at the same elevation as the door sill of a parked aircraft. Simultaneously driving the wheels 24, which also may be powered by independently energized reversible electric motors, away from the rotunda 14 will extend the bridge 10, ultimately to the position shown in FIGS. 1 and 2, while simultaneously driving both wheels toward the rotunda 14 will retract the bridge, ultimately to the position shown in FIG. 3. Independently driving the wheels 24 at different speeds and/or directions will cause the bridge 10 to rotate about the vertical axis 15 of the rotunda.

Figure 4:
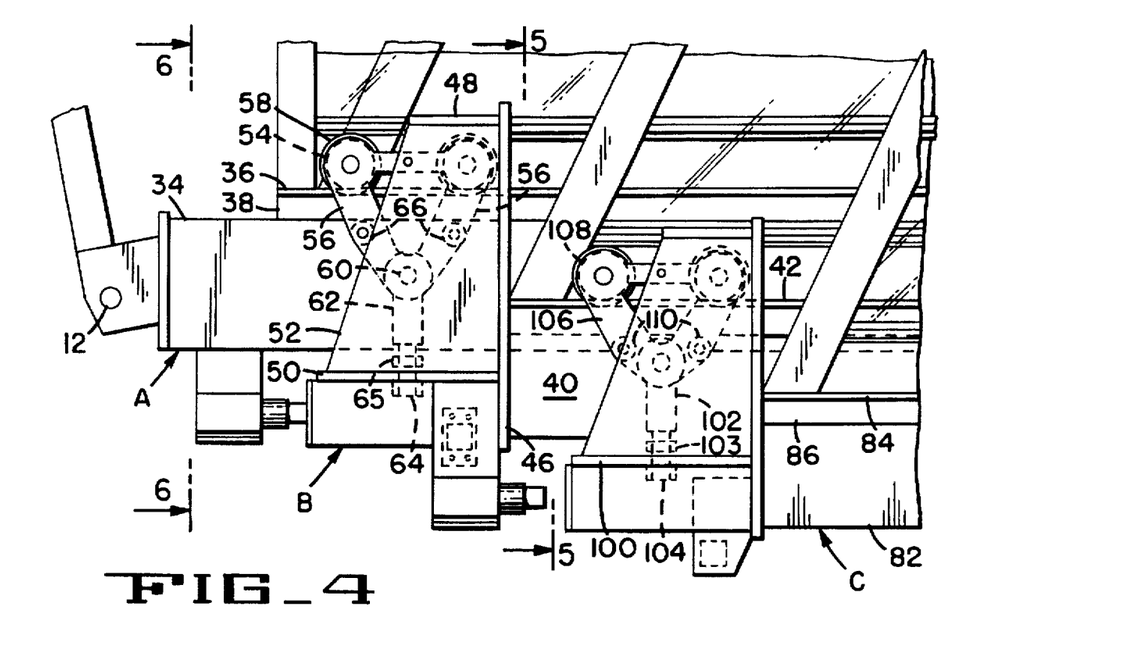
FIG. 4 is a side detail view of a portion of FIG. 3 showing the roller assemblies carried by the outer tunnel and engaging the inner tunnel.
Figure 6:
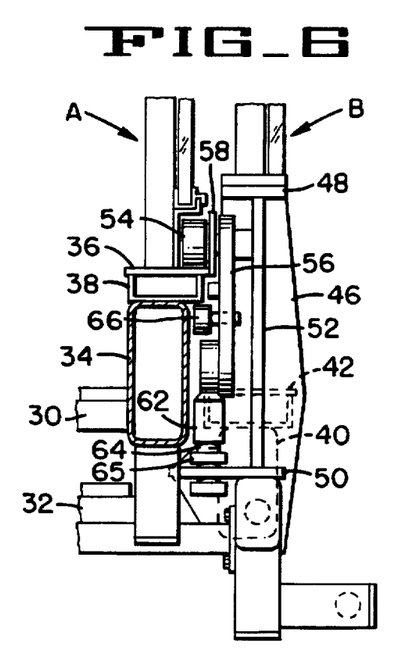
FIG. 6 is a partial cross-sectional view taken on line 6—6 of FIG. 4.
Figure 7:
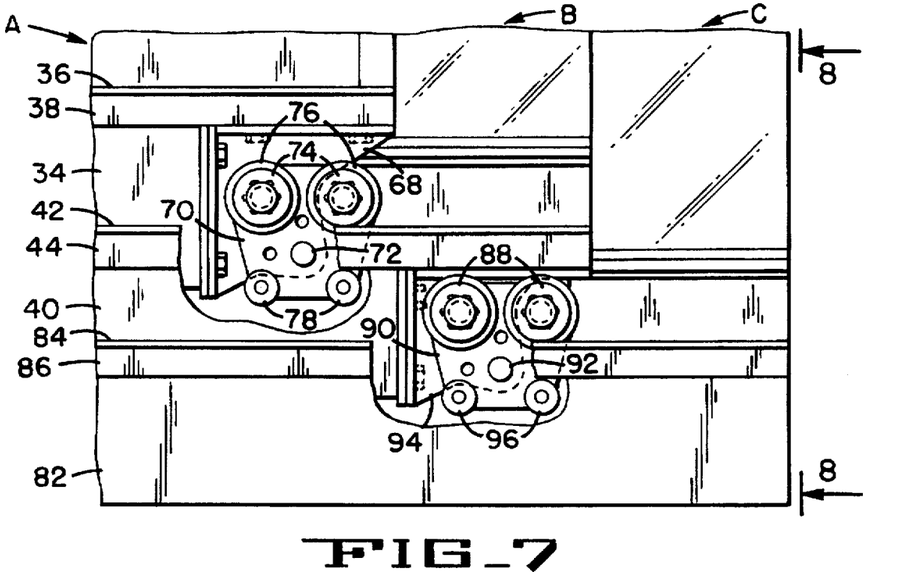
FIG. 7 is a side detail view of a portion of FIG. 3, with portions broken away, showing the roller assemblies carried by the inner tunnels and engaging the outer tunnels.

Considering first the relationship between the A and B tunnels, which relationship is shown in FIGS. 4 and 6–8, each of the A and B tunnels has a floor 30 and 32 respectively. The floor 30 of the A tunnel spans the distance between and is secured to a pair of essentially parallel tubular beams 34, one of which is shown in FIGS. 4, 6 & 7 and the other one in FIG. 8, extending substantially the length of the A tunnel. Since each side of the A tunnel, and each of the B and C tunnels as well, is a mirror image of the other, a description of only one side will be sufficient for a complete understanding of the invention. In this regard, references to left and right will be as viewed from the overrotunda 14 looking toward the cab 26, while inboard and outboard will refer respectively to the ends adjacent to and remote from the rotunda, and inward toward the middle of the tunnels and outward away therefrom. A roller supporting flange 36 formed of a high strength material, such as T-1 steel, for example, is secured to and extends beyond an upward facing channel 38 to form a box member resting upon and secured to the beam 34. The floor 32 of the B tunnel also spans the distance between and is secured to a similar pair of beams 40, each secured to and supporting a similar box member formed by a flange 42 secured to an overlapping channel 44. A vertical plate 46 attached to the inboard end of the beam 34 with upper and lower horizontal plates 48 and 50 respectively attached thereto. A stiffening web 52 is secured to all three plates 46, 48 and 50. A pair of flanged rollers 54 are rotatably mounted on a triangular shaped carriage 56 and normally are engageable with and roll on the outward projecting portion of the flange 36 associated with the A tunnel. The flanged portion 58 of the flanged rollers 54 engages the outer edge of the flange 36 and provide lateral positioning, alignment and guidance for the B tunnel relative to the A tunnel. The carriage 56 is pinned by pin 60 to an internally threaded rod end 62, so the loads on the rollers 54 are equalized. A bolt 64 passes through a hole in the lower plate 50 and engages the threaded rod end 62, with a lock nut 65 threaded onto the bolt 64 on the side of the plate 50 opposite the head of the bolt 64, thereby securing the carriage to the B tunnel while permitting variations in the effective length of the rod 62. A pair of small rollers 66 are also rotatably carried by the carriage 56 and are engageable with the lower surface of the channel 44 to transfer upward forces from the B tunnel to the A tunnel during load reversal caused by the center of gravity of the bridge passing outboard of the jacks 22, as occurs in most bridges when fully retracted, as shown in FIG. 3. The entire assembly with the rollers 54 and 66 is typically referred to as a truck. At the outboard end of the A tunnel, the channel 38 and flange 36 extend beyond the beam 34 and a bracket 68 is bolted thereto. A carriage 70 is pinned by pin 72 to the bracket 68 for equalizing the loads on a pair of flanged rollers 74 rotatably carried by the carriage and engageable with the inward projecting upper surface of the flange 42 associated with the B tunnel. The flanged portion 76 of the rollers 74 engage the inner edge of the flange 42. A pair of small rollers 78 are also rotatably carried by the carriage 70 and are engageable with the inner lower surface of the channel 44 to transfer reverse loads from the A tunnel to the B tunnel. Under normal conditions, the rollers 74 positioned at the outboard end of the A tunnel are forced against the flange 42 of the B tunnel. With respect to the A tunnel, this results in an upward force on the outboard end of the A tunnel, which force is always applied at the same point, while the load imposed on the A tunnel by the rollers 56 attached to the B tunnel results in a downward force, the point of application being variable as the B tunnel is telescoped over the A tunnel. All loads between the A tunnel and B tunnel are transferred to the structural beams without being transmitted through the side walls.

Figure 5:
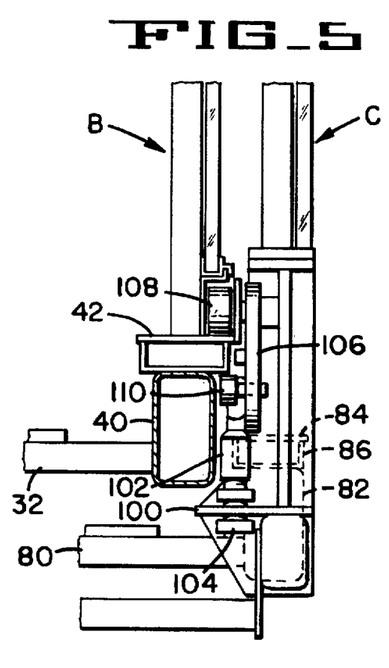
FIG. 5 is a partial cross-sectional view taken on line 5—5 of FIG. 4.
Figure 8:
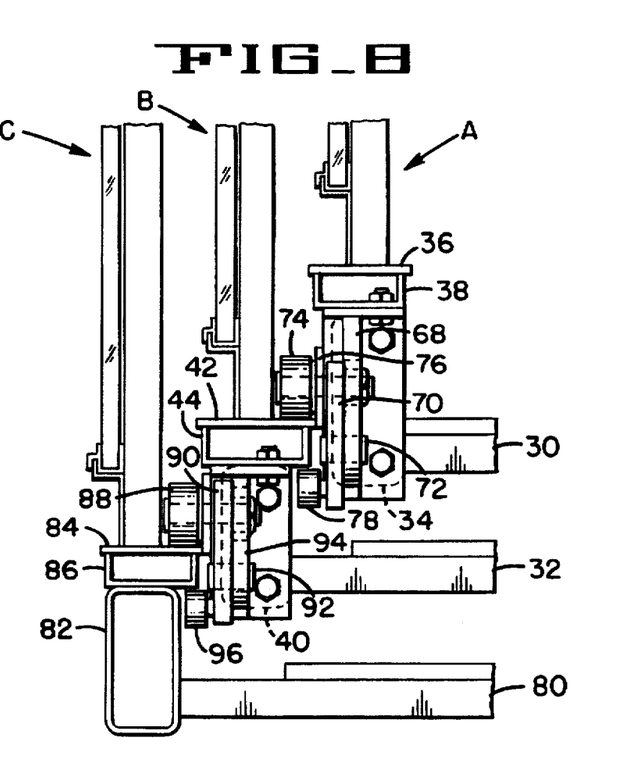
FIG. 8 is a partial cross-sectional view taken on line 8—8 of FIG. 7.

In a manner similar to the A and B tunnels, the floor 80 of the C tunnel is connected to and supported by a pair of beams 82, the right one being shown in FIG. 5 and the left one in FIG. 8. A flange 84 attached to and overlapping a channel 86 is supported on and secured to the beam 82 is engageable by a pair of flanged rollers 88, as best shown in FIGS. 7 and 8. The rollers 88 are rotatably carried by a carriage 90 pivotally connected by pin 92 to a bracket 94 bolted to the outboard end of the beam 40 and the overhanging channel 42. A pair of small rollers 96 are rotatably secured to the carriage 90 and are engageable with the lower surface of the channel 86 to accommodate load reversal. A bracket, similar to the one affixed to the inboard end of the beam 40, includes a horizontal plate 100 attached to the inboard end of the beam 82. A bolt 104 extends through a hole in the plate 100 and engages an internally threaded rod end 102 and a lock nut to adjustably secure the rod end thereto. A carriage 106 is pivotally connected to the rod 102 and rotatably mounts a pair of flanged rollers 108 which are engageable with the upper surface of the flange 42 on the B tunnel and a pair of load reversal accommodating small load rollers 110. The load of the C tunnel normally acting downward through the rollers 108 exerts a downward force on the beam 40 of the B tunnel. Similarly, the rollers 88 carried by the B tunnel exert a downward force on the beam 82 of the C tunnel. During load reversal the small rollers 96 carried by the B tunnel exert an upward force on the bottom side of the channel 86 attached to the beam 82 of the C tunnel and the rollers 110 exert an upward force on the bottom side of the box member channel associated with flange 42, the box member attached to the beam 40 of the B tunnel. The forces encountered during load reversal are smaller, which is the reason only relatively small rollers are required. In either situation, the forces are transmitted directly to the main structural members, i.e. the beams 34, 40 and 82 and their associated channels 38, 44 and 86 and flanges 36, 42 and 84, of the bridge 10, and consequently, the walls of the bridge are free from stresses.

Figures 9, 10:
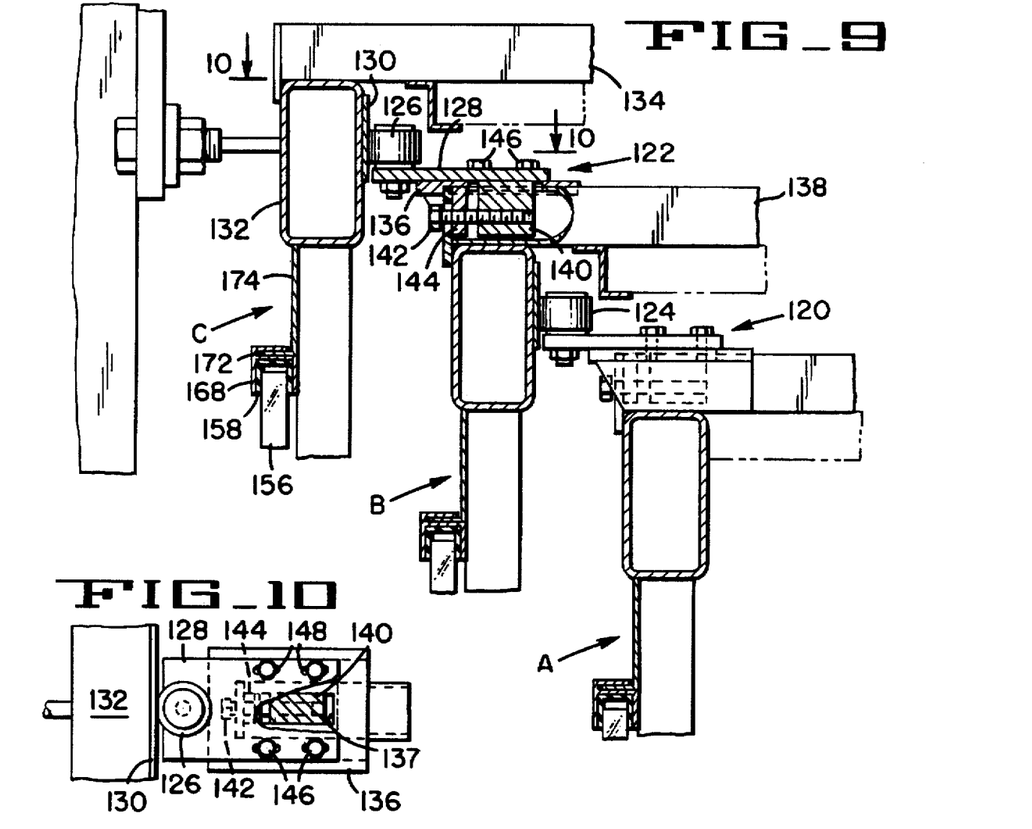
FIG. 9 is a partial cross-sectional view taken on line 9—9 of FIG. 3.
FIG. 10 is a view taken on line 10—10 of FIG. 9.

Referring to FIGS. 9 and 10, there is shown a means for laterally aligning, guiding and, if necessary, squaring the upper portion of the tunnels. Roller assemblies 120 and 122 are mounted on the A and B tunnel and have guide rollers 124 and 126 respectively engaging the B and C tunnels. Since the two assemblies are identical, a description of only assembly 122 will suffice.

The roller 126 is rotatably mounted on a plate 128 and engages a wear strip 130 affixed to a horizontal beam 132 extending the length of the C tunnel and forming a part of the truss structure supporting the roof 134. The plate 128 is supported by a U-shaped bracket 136 secured to the top of a roof cross member 138 for the B tunnel. The bracket 136 and the cross member 138 are provided with aligned rectangular openings 138. A block 140 attached to the lower side of the plate 128 extends through and is slideable in the openings 137. An adjusting bolt 142 extends through a hole in a downward extending plate 144 and engages a threaded hole in the block 140, so that the adjusting bolt may move the roller 126 outward. Lock bolts 146 extend through slots 148 in the plate 128 to engage threaded holes (not shown) in the bracket 136 to secure the plate 128 to the bracket 136 once lateral adjustment of the roller 126 has been effected.

If it is necessary to square the tunnel, the lock bolts 146 on roller assemblies on each side of the tunnel are loosened and the adjusting bolt on the side the upper portion must be moved to square the tunnel rotated to back the associated roller away from the wear strip, although the associated roller may not actually move away from the wear strip. The adjusting bolt on the opposite side is rotated to extend the associated roller outward until the tunnel is square. The adjusting screw that had been backed-off is then rotated until the associated roller is just bearing against its wear strip and all lock bolts are then tightened.

Figure 11:
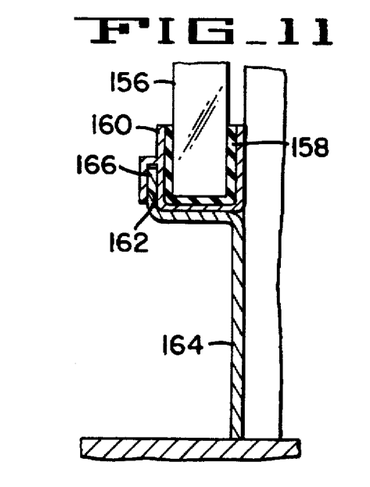
FIG. 11 is a cross-sectional view showing the mounting of the lower edge of a pane of glass to form the side wall of the bridge.
Figures 12, 13:
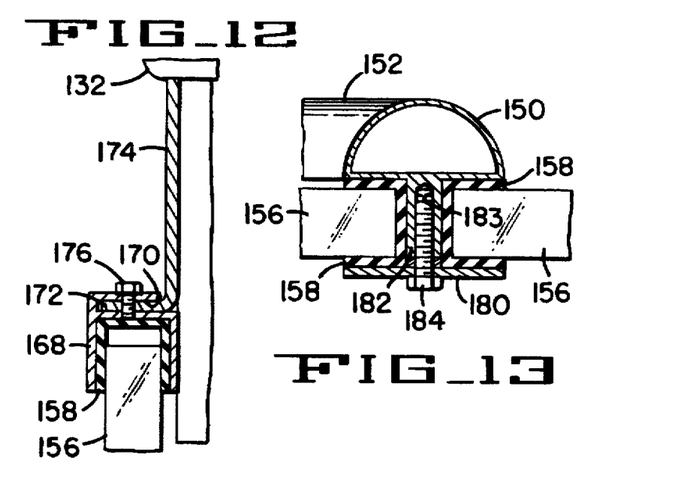
FIG. 12 is a view similar to FIG. 11, but showing the mounting of the upper edge of the glass pane.
FIG. 13 is a cross-sectional view taken on line 13—13 of FIG. 3.
Figure 14:
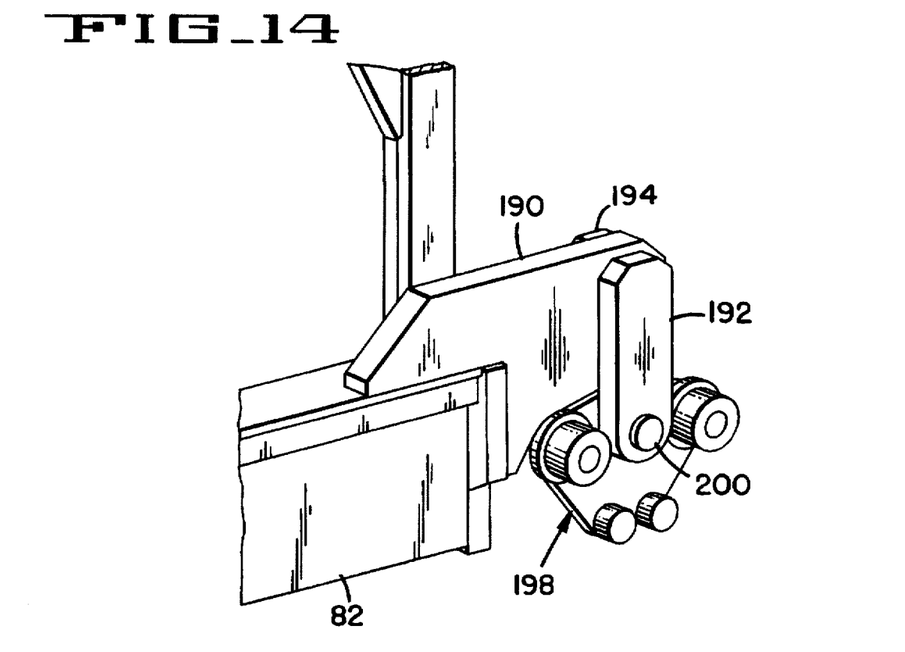
FIGS. 14 and 15 are isometric views of a preferred embodiment of truck for the outboard end of the A and B tunnels.
Figure 15:
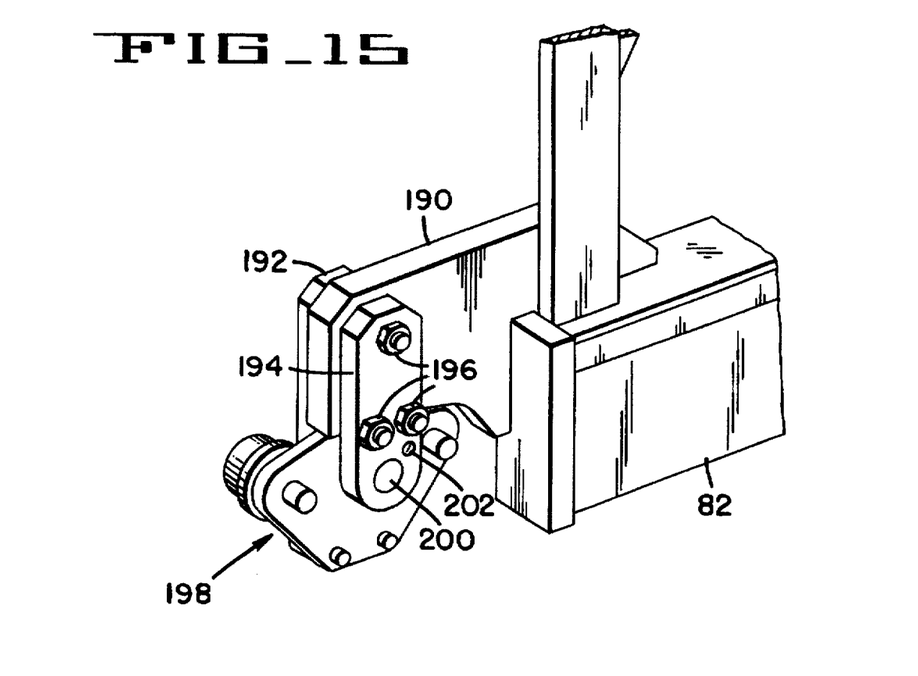
Figure 16:
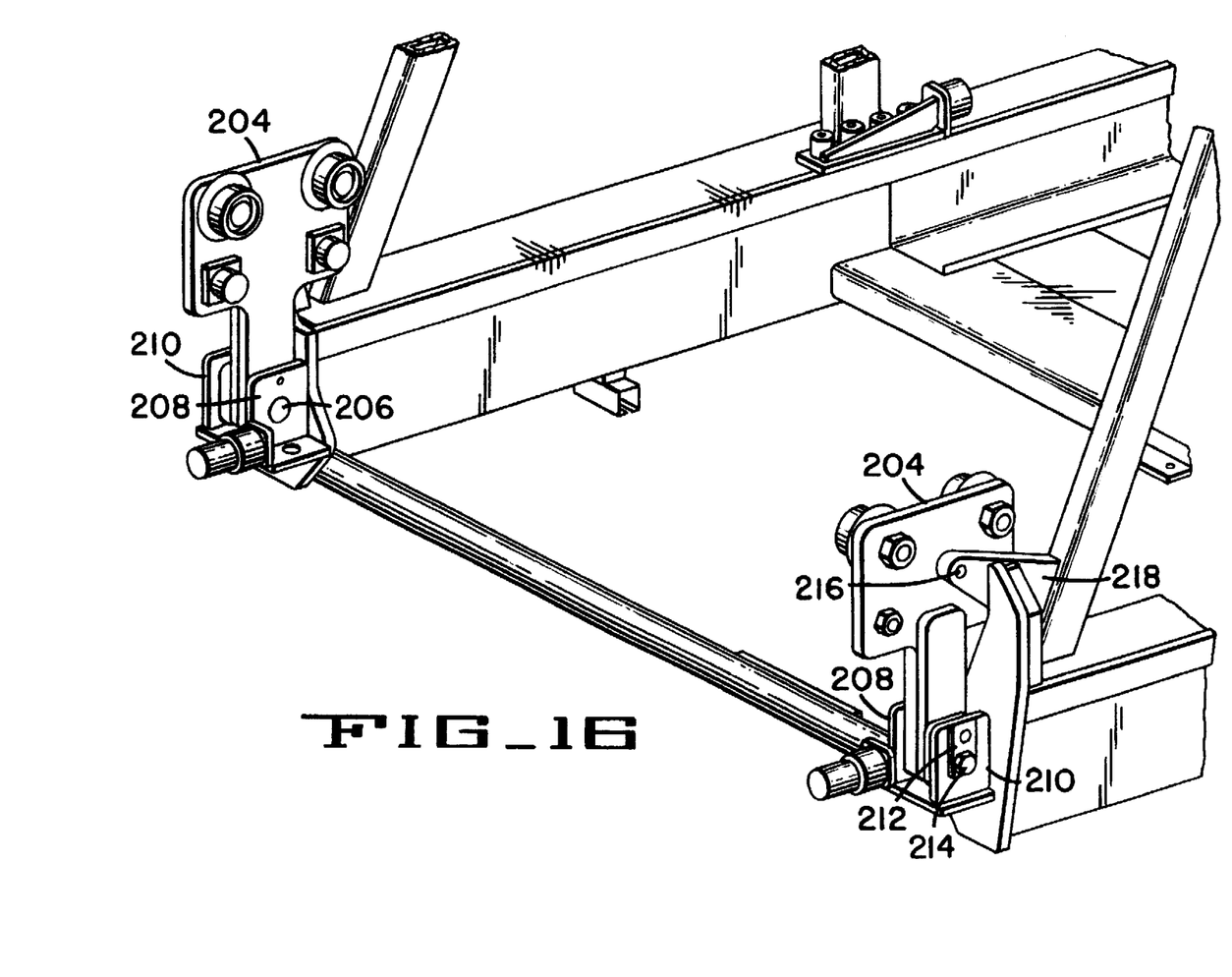
FIG. 16 is an isometric view of a preferred embodiment of truck for the inboard end of the B and C tunnels.

The weight of the roof forming a part of each tunnel, as well as the weight of snow and ice accumulating thereon, must be transferred to the lower beams, e.g. 82, of the tunnel. This is achieved by a truss structure, as best shown in FIG. 3, which includes a plurality of vertical members 150 and angled members 152 extending between and secured to lower beams 82 and the upper beams 132. With the loads imposed by the roof being transmitted to the lower beams through the truss structure, the side walls of the tunnel may be formed of glass panels, or other transparent material, which allow light into the tunnel and make the bridge appear less confining. The mounting of the glass panels is shown in FIGS. 11–13. Each glass panel is rectangular and extends between the mid-points of adjacent vertical members 150 of the truss structure, with a U-shaped channel 158 formed of rubber or similar material extending along each of its four sides. The channel 158 along the lower edge of the glass panel 156 rests in and is supported by a complementary bracket 160 having a vertically extending groove 162. The bracket rests upon a support member secured to the lower beam 82. An upstanding lip 166 formed on the support member 164 engages the groove 162 to retain the lower end of the panel 156. As shown in FIG. 11 the support member 164 is affixed to the box member flanges such as 42 in FIGS. 5, 36 in FIG. 6, and 84 in FIG 4. A similar bracket 168 extends along the upper edge of the panel 156 and has a horizontal extending groove 170 engaging a horizontal flange formed on a support member 174 secured to the upper beam 132. A plurality of bolts 176 spaced along the width of the panel 156 secure the bracket 168 to the flange 172. The support members such as 164 and 174 may also be attached to the diagonal members of the truss structure where the elements are proximate each other. As shown in FIG. 13, the sides of adjacent panels 156 are retained by a vertical metal strip 180. The vertical member 150 of the truss structure is provided with an outwardly extending flange 182 having tapped holes 183 spaced along its length to accept bolts 184 that extend through aligned holes in the strip 180. The glass panels are thus held securely in place and are sealed, by compression of the channels 158, against water leakage and air infiltration. It has been found that with proper production methods the provision for vertical adjustment of the trucks is not necessary. The trucks shown in FIGS. 14 and 15 provide lateral, i.e. side to side, adjustment but do not adjust vertically; FIG. 14 being a view from the outside of the track on the right side of the outboard end of the A or B tunnel and FIG. 15 being the same truck viewed from the inside of the tunnel. A weldment 190 is affixed to and cantilevered from the outboard end of the lower beam of the tunnel. An outer leg 192 is formed as part of the weldment and creates, with an inner or trap leg 194 secured to the weldment 190 by cap screws engageable with threaded holes therein, a clevis. The truck 198 is provided with a pair of flanged upper rollers and a pair of smaller lower rollers for reverse loading that function in the same manner as those described previously in connection with FIGS. 7 and 8. The truck is pivotally connected within the clevis by a pin 200. Since the thickness of the weldment 190 is greater than the thickness of the truck 198, the truck can be positioned along the length of pin 200 a distance equal to the difference in the two thicknesses, which difference for practical purposes needs be about 2.5 centimeters. An adjusting screw 202 engages a threaded hole in the inner leg 194 to position the truck 198 on the pin 200. Similar trucks 204 on the inboard end of the B and C tunnels are shown in FIG. 16, which trucks have pairs of upper flanged rollers and lower reverse loading rollers that function in the same manner as those described in connection with FIGS. 4–6. The trucks 204 are mounted on a pin 206 held between inner and outer legs respectively secured to the inboard ends of the lower beams. A plate 212 is secured to the outer leg 210 by a cap screw 213 engaging a threaded hole in the outer leg. A bolt 214 passes through a hole in the plate 212 and engages a threaded hole in the pin 206, which arrangement holds the pin 206 in place during normal operation while permitting removal of the pin 206 for replacement of the truck 204 when necessary. The span between the legs 208 and 210 is greater than the thickness of the truck 204 so the truck may laterally positioned on pin 206. Such lateral positioning is achieved by an adjusting screw 216 engaging a threaded hole in a bracket 218 secured from the end of the lower beam to bear against the truck 204. The tunnels can be moved laterally relative to each other by loosening the screw 216 on the side toward which the inner tunnel is to be shifted and tightening the opposite screw 216.

Figure 17:
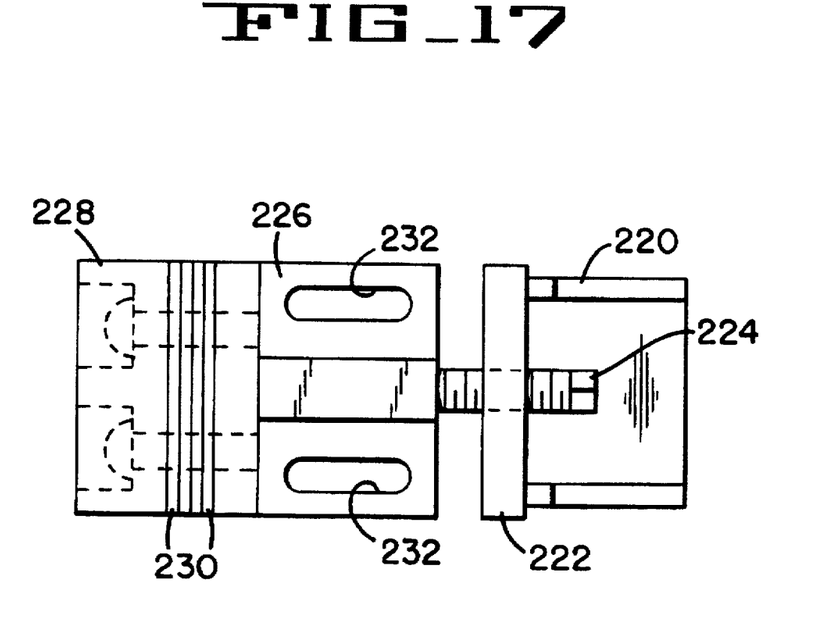
FIG. 17 is a plan view of a stabilizer for the outboard end of the A and B tunnels.
Figure 18:
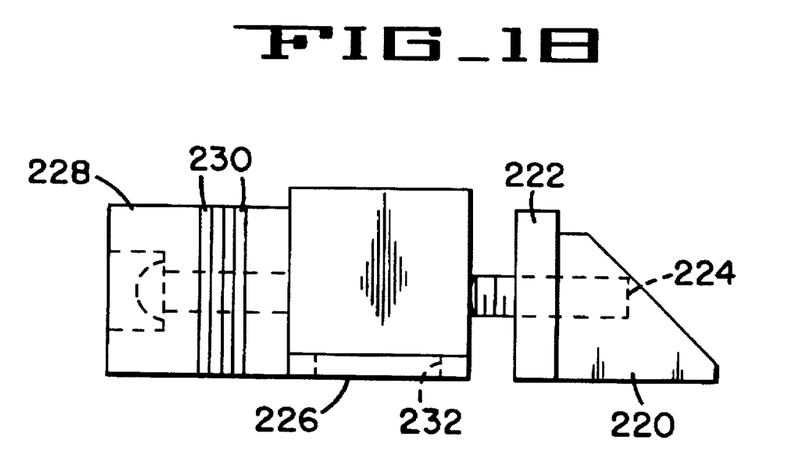
FIG. 18 is a side view of the stabilizer shown in FIG. 17.
Figure 19:
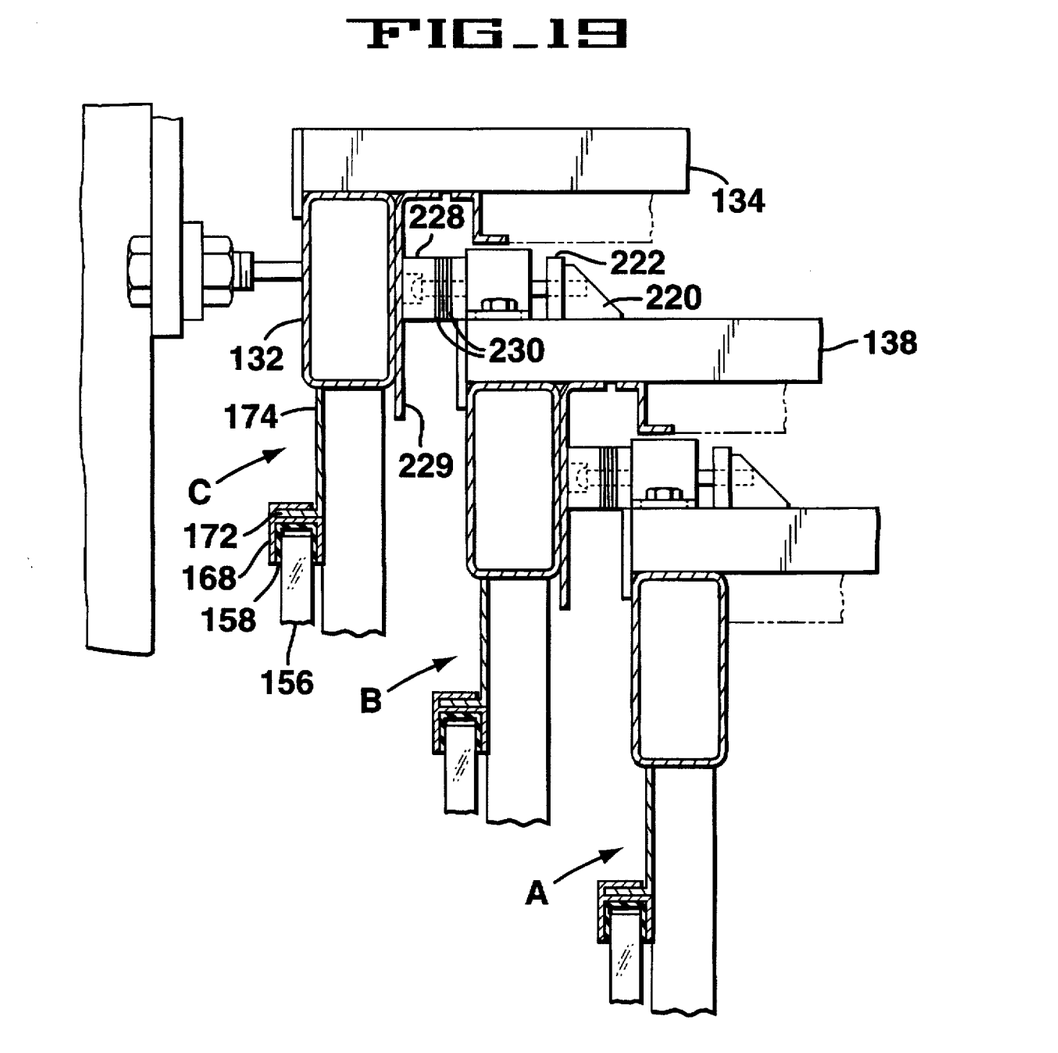
FIG. 19 is a partially sectioned schematic view of a portion of the passenger boarding bridge as shown generally in FIG. 9, showing an alternative embodiment using sliding stabilizers.

Instead of stabilizer rollers, such as those described in connection with FIGS. 9 and 10, sliding stabilizers may be provided on each side of the outboard ends of the A and B tunnels. A preferred embodiment of such stabilizers is shown in FIGS. 17 and 18. The stabilizer has a fixed portion 220, including a base member secured, such as by welding, to the upper cross member at the outboard end. A transverse member 222 is affixed to the base member with a socket set screw 224 engaging a threaded hole in the transverse member 222 to bear against a metal adjusting block 226. Four relatively thin layers of rubber 230 are trapped between the adjusting block 226 and a slider block 228 formed of a material having good wear and sliding characteristics, such as nylatron. The rubber layers 230 and the slider block 228 are attached to the adjusting block 222 by cap screws extending therethrough and engaging tapped holes in the adjusting block 226, the heads of the cap screws being positioned in recesses in the slider block 228. Lock bolts extend through slots 232 in the adjusting block and engage threaded holes in the cross member to lock the slider block 228 in position when adjustment has been effected. The slider block 228 engages the downward extending leg of an L-shaped stainless steel strip 229 attached to the upper corners of the outer tunnel, i. e. the B or C tunnel when the stabilizers are affixed to the A or B tunnels respectively. The L-shaped strips 229, being positioned at the upper corners of the outer tunnel, serve both as a bearing surface for the slider block 228 and as trim to hide the juncture between the ceiling and the upper horizontal beam, e.g. 132, and/or any decorative covering applied thereto. In order to simplify installation and to provide a smooth, flat surface for the slider block 228, the L-shaped strip is preferably attached with double sided adhesive tape with mechanical fasteners, such as rivets, being used only at the ends thereof. In order to effect proper alignment when the A tunnel is pivoting on the hinge pin 12, a similar slider is preferable provided at the inboard end of the A tunnel, with the base member affixed to the rigid frame portion of the rotunda 14 and the slider block engaging the upper sides of the inboard end of the A tunnel.

In summary the invention herein comprises a passenger boarding bridge having inner and outer tunnels. The inner tunnel telescopes inside an outer tunnel. These inner and outer tunnels define an overlapping end on each tunnel. The tunnels also have roofs and floors which are supported by beams extending along each side of the floor. These beams are provided with flanges, having upper and lower surfaces, the flanges secured to each of the beams of the inner and outer tunnels. Support for the tunnel sections, relative to each other, is provided by a first roller assembly carried by the overlapping end of the inner tunnel. This first roller assembly is attached to the outboard end of the inner tunnel beams and rollingly engages the upper surfaces of the outer tunnel flanges. As second roller assembly is carried by the overlapping end of the outer tunnel and rollingly engages the upper surfaces of the inner tunnel flanges. This structure provides a structure whereby compressive forces on the side wall of the inner tunnel, as are normally imposed by a resultant downward load in the overlapping area, are reduced to those forces inherent in the weight of the roof and sidewalls. The compressive forces now seen in the improved structure are compressive force not resulting from said overlapping of said inner and outer tunnels.

What is claimed is:

1. A passenger boarding bridge having inner and outer tunnels, said inner tunnel telescoping inside the outer tunnel and defining an overlapping end on each of said tunnels, each tunnel having side walls, said inner tunnel having an outboard end and having side walls subjected to compressive forces, a roof, including and upper cross member, and a floor, said side walls, roof and floor supported by beams extending along each side of said floor, said passenger boarding bridge comprising:

flanges having upper and lower surfaces, said flanges secured to each of said beams in the inner and outer tunnels;

a first roller assembly carried by the overlapping end of said inner tunnels, said first roller assembly attached to the outboard end of the inner tunnel beams and rollingly engaging said upper surfaces of said outer tunnel flanges; and a second roller assembly carried by said overlapping end of said outer tunnel and normally rollingly engaging said upper surfaces of said inner tunnel flanges, whereby said compressive forces on said side walls of said inner tunnel are compressive forces not resulting from said overlapping of said inner and outer tunnels.

2. The invention according to claim 1, wherein said flanges include an outer vertical surface and said first and second roller assemblies include flanged rollers having flanged portions engageable with the associated vertical surface to maintain the lateral position of the inner and outer tunnels.

3. The invention according to claim 1 and further comprising:

a reverse loading roller carried by each of said first and second roller assembly means and rollingly engaging the lower surfaces of the flanges normally engaged by the respective roller assembly means to resist a reversed loading.

4. The invention according to claim 1 and further comprising:

an upper roller rotatable about a vertical axis carried by the overlapping end of the inner tunnel and rollingly engaging the upper portion of the side wall of the outer tunnel.

5. The invention according to claim 1 and further comprising:

truss members extending between and secured to said roof and said beams on each of said tunnels so that forces imposed on and by the roof are transferred to the associated beams through said truss members rather than said side walls.

6. The invention according to claim 5, wherein said side walls are made of panels of transparent material having a lower edge and an upper edge.

7. The invention according to claim 6, wherein said transparent material is glass.

8. The invention according to claim 7, and further comprising:

a lower channel secured to and extending along the outside edge of each wall;

an upper projection secured to and extending along the outside edge of each wall;

the lower edge of each panel of transparent material being seated in and retained by said lower channel;

an upper channel engaging said upper edge of each transparent panel; and means securing said upper channel to said upper projection.

9. The invention according to claim 8, and further comprising elastomer U-shaped members interposed between the upper and lower channels and the corresponding edge of each transparent panel.

10. The invention according to claim 1 and further comprising a base member affixed to said upper cross member of the roof at said outboard end of said inner tunnel;

a slider block adjustably positioned relative to said base member and engaging the upper side wall of the outer tunnel.

11. The invention according to claim 10 wherein said slider block is formed of nylatron.

12. The invention according to claim 10 and further comprising a stainless steel member affixed to said side wall and slideably engageable by said slider block.

13. The invention according to claim 12 wherein said tunnels have an interior ceiling and said stainless steel member is L-shaped and positioned to cover the juncture between said ceiling and the side wall.

14. The invention according 12 wherein said L-shaped member is affixed with mechanical fasteners at its ends only and secured by adhesive therebetween.

15. A passenger boarding bridge having inner and outer tunnels, said inner tunnel telescoping inside the outer tunnel and defining an overlapping end on each of said tunnels, each tunnel having a roof, side walls, said side walls subject to compressive forces, and a floor, said side walls, roof and floor supported by beams extending along each side of said inner and outer tunnels, comprising:

flanges having upper and lower surfaces, said flanges secured to each of said beams of the inner and outer tunnels;

first truck means carried by the overlapping end of said inner tunnel, said first track having first load rollers normally rollingly engaging said upper surfaces of said outer tunnel flanges; and second track means carried by said overlapping end of said outer tunnel and having second load rollers normally rollingly engaging said upper surfaces of said inner tunnel flanges, whereby said compressive forces on said side walls of said inner tunnel are compressive forces not resulting from said overlapping of said inner and outer tunnels.

16. The invention according to claim 15 and further comprising:

a first pin means supported from the overlapping end of said inner tunnel and rotatably mounting said first truck means; and means for positioning said first truck means along the length of said first pin means.

17. The invention according to claim 16 and further comprising:

a second pin means supported from the overlapping end of said outer tunnel and rotatably mounting said second truck means; and means for positioning said second truck means along the length of said second pin means.

18. The invention according to claim 15 wherein said roof includes a upper cross member, and further comprising:

a base member affixed to the upper cross member at the outboard end of the inner tunnel;

a slider block adjustably positioned relative to said base member and engaging the upper side wall of the outer tunnel.

19. The invention according to claim 16 wherein said bridge includes a rotunda with a hinge pin about which the inboard end of the inner tunner may pivot and further comprising:

a sliding stabilizer connected to one of the rotunda and inboard end of the inner tunnel and slideably engaging the other thereof to effect alignment of the inner tunnel and said rotunda as said inner tunnel pivots on said hinge pin.

* * * * *